(12) United States Patent
O'Neill

(10) Patent No.: US 10,486,579 B2
(45) Date of Patent: Nov. 26, 2019

(54) LIGHTWEIGHT TRANSPORT, STORAGE AND DELIVERY SYSTEM

(71) Applicant: Kevin M. O'Neill, Plano, TX (US)

(72) Inventor: Kevin M. O'Neill, Plano, TX (US)

( * ) Notice: Subject to any disclaimer, the term of this patent is extended or adjusted under 35 U.S.C. 154(b) by 0 days.

(21) Appl. No.: 16/280,782

(22) Filed: Feb. 20, 2019

(65) Prior Publication Data

US 2019/0255982 A1    Aug. 22, 2019

Related U.S. Application Data

(60) Provisional application No. 62/767,675, filed on Nov. 15, 2018, provisional application No. 62/633,057, filed on Feb. 20, 2018.

(51) Int. Cl.
| | |
|---|---|
| *B60P 1/64* | (2006.01) |
| *B65D 88/16* | (2006.01) |
| *B60P 1/48* | (2006.01) |
| *B60P 7/13* | (2006.01) |
| *B66C 13/22* | (2006.01) |

(52) U.S. Cl.
CPC ............. *B60P 1/6472* (2013.01); *B60P 1/483* (2013.01); *B60P 7/132* (2013.01); *B65D 88/1656* (2013.01); *B66C 13/22* (2013.01)

(58) Field of Classification Search
CPC .............. B60P 1/6472; B65D 88/1606; B65D 88/1618; B65D 88/1668; B65D 88/1675; B65D 88/1681; B65D 88/1687; B66F 9/125; B66F 9/186; B66F 9/0655
USPC ....... 414/376, 381, 419, 628, 810, 629, 632, 414/641
See application file for complete search history.

(56) References Cited

U.S. PATENT DOCUMENTS

| | | | | |
|---|---|---|---|---|
| 4,095,714 A | * | 6/1978 | Schuster ................. | B66F 9/125 414/607 |
| 4,143,782 A | * | 3/1979 | Dengler .................. | B66F 9/125 414/620 |
| 4,232,803 A | | 11/1980 | Muller et al. | |
| 4,381,900 A | * | 5/1983 | Schlottman ........... | B66F 9/0655 414/692 |
| 4,499,599 A | | 2/1985 | Polett et al. | |
| 5,333,757 A | | 8/1994 | Volk et al. | |
| 5,344,048 A | | 9/1994 | Bonerb | |
| 5,415,323 A | | 5/1995 | Fenelon | |
| 5,558,485 A | | 9/1996 | Haynes | |

(Continued)

OTHER PUBLICATIONS

"International Search Report and Written Opinion, PCT/US2019/018799", dated Jun. 3, 2019.

*Primary Examiner* — Kaitlin S Joerger
(74) *Attorney, Agent, or Firm* — Law Office of Mark Brown, LLC; Christopher M. DeBacker

(57) ABSTRACT

Reusable, flexible, lightweight, low cost flexible intermediate bulk containers (FIBCs) for the delivery of granular proppant material for fracing that will allow the transport of higher weights of proppant, such as sand, per truck load. The invention includes a container made of a high strength, flexible material with a top opening for loading and deploying the proppant. The container can be lifted and deployed with a fork truck or crane. Alternatively, proprietary deployment systems, such as a conveyor system, can be used to quickly and efficiently deploy the proppant from the container at a desired site.

29 Claims, 18 Drawing Sheets

(56) References Cited

U.S. PATENT DOCUMENTS

| | | | | |
|---|---|---|---|---|
| 5,713,510 | A * | 2/1998 | Walton | B65D 25/22 |
| | | | | 220/754 |
| 5,918,984 | A * | 7/1999 | LaFleur | B66C 1/226 |
| | | | | 206/554 |
| 5,931,205 | A * | 8/1999 | Jasica | B65B 1/04 |
| | | | | 141/286 |
| 6,079,934 | A | 6/2000 | Beale | |
| 6,575,629 | B1 * | 6/2003 | Perkins | B65D 77/061 |
| | | | | 220/9.4 |
| 7,018,098 | B2 * | 3/2006 | Richardson, Jr. | B65D 88/1618 |
| | | | | 220/495.03 |
| 7,476,028 | B2 | 1/2009 | Richardson, Jr. et al. | |
| 7,837,427 | B2 | 11/2010 | Beckel et al. | |
| 8,545,161 | B2 * | 10/2013 | Wanek-Pusset | B66F 9/125 |
| | | | | 187/237 |
| 9,061,815 | B2 * | 6/2015 | Cavenagh | B65D 88/1625 |
| 9,248,772 | B2 | 2/2016 | Oren | |
| 9,340,353 | B2 | 5/2016 | Oren et al. | |
| 9,358,916 | B2 | 7/2016 | Oren | |
| 9,421,899 | B2 | 8/2016 | Oren | |
| 9,670,752 | B2 | 6/2017 | Glynn et al. | |
| 9,751,691 | B2 * | 9/2017 | Hunter | B65D 88/1668 |
| 9,932,181 | B2 | 4/2018 | Oren | |
| 10,202,237 | B1 * | 2/2019 | Farrell | B65D 88/1668 |
| 10,259,646 | B2 * | 4/2019 | Park | B65D 88/1625 |
| 2002/0164237 | A1 * | 11/2002 | Nyhof | B65G 65/23 |
| | | | | 414/421 |
| 2002/0191869 | A1 * | 12/2002 | Stewart | B65D 31/04 |
| | | | | 383/24 |
| 2004/0151567 | A1 * | 8/2004 | Magni | B66F 9/0655 |
| | | | | 414/664 |
| 2004/0264814 | A1 * | 12/2004 | Eisenbarth | B65D 88/1612 |
| | | | | 383/32 |
| 2006/0263191 | A1 * | 11/2006 | Gokita | B66F 9/0655 |
| | | | | 414/695 |
| 2007/0003395 | A1 * | 1/2007 | Segerljung | B66F 9/0655 |
| | | | | 414/227 |
| 2008/0008562 | A1 | 1/2008 | Beckel et al. | |
| 2010/0065466 | A1 * | 3/2010 | Perkins | B65D 19/385 |
| | | | | 206/600 |
| 2010/0155066 | A1 | 6/2010 | Fordyce | |
| 2010/0224520 | A1 * | 9/2010 | Kohen | B65D 19/385 |
| | | | | 206/386 |
| 2011/0311165 | A1 * | 12/2011 | Lommerts | B65D 88/1687 |
| | | | | 383/6 |
| 2012/0193354 | A1 * | 8/2012 | Cavenagh | B65D 88/1612 |
| | | | | 220/9.3 |
| 2012/0198792 | A1 * | 8/2012 | Stelliferi | B65B 31/00 |
| | | | | 53/434 |
| 2013/0022441 | A1 | 1/2013 | Uhryn et al. | |
| 2014/0086512 | A1 | 3/2014 | Brown et al. | |
| 2014/0151049 | A1 | 6/2014 | Sanborn et al. | |
| 2014/0212070 | A1 * | 7/2014 | Diao | B65D 88/1618 |
| | | | | 383/24 |
| 2015/0284194 | A1 | 10/2015 | Oren et al. | |
| 2016/0009489 | A1 | 1/2016 | Lofton et al. | |
| 2016/0207699 | A1 | 7/2016 | Oren et al. | |
| 2016/0264351 | A1 * | 9/2016 | Plunkett | B65D 75/5877 |
| 2017/0225883 | A1 | 8/2017 | Oren | |
| 2017/0320684 | A1 | 11/2017 | Oren et al. | |
| 2018/0126661 | A1 * | 5/2018 | Dunlap | B29C 65/18 |
| 2018/0148269 | A1 | 5/2018 | Oren et al. | |
| 2018/0194549 | A1 * | 7/2018 | Chartrel | B65D 88/1618 |
| 2018/0265280 | A1 * | 9/2018 | Park | B65D 88/1681 |

* cited by examiner

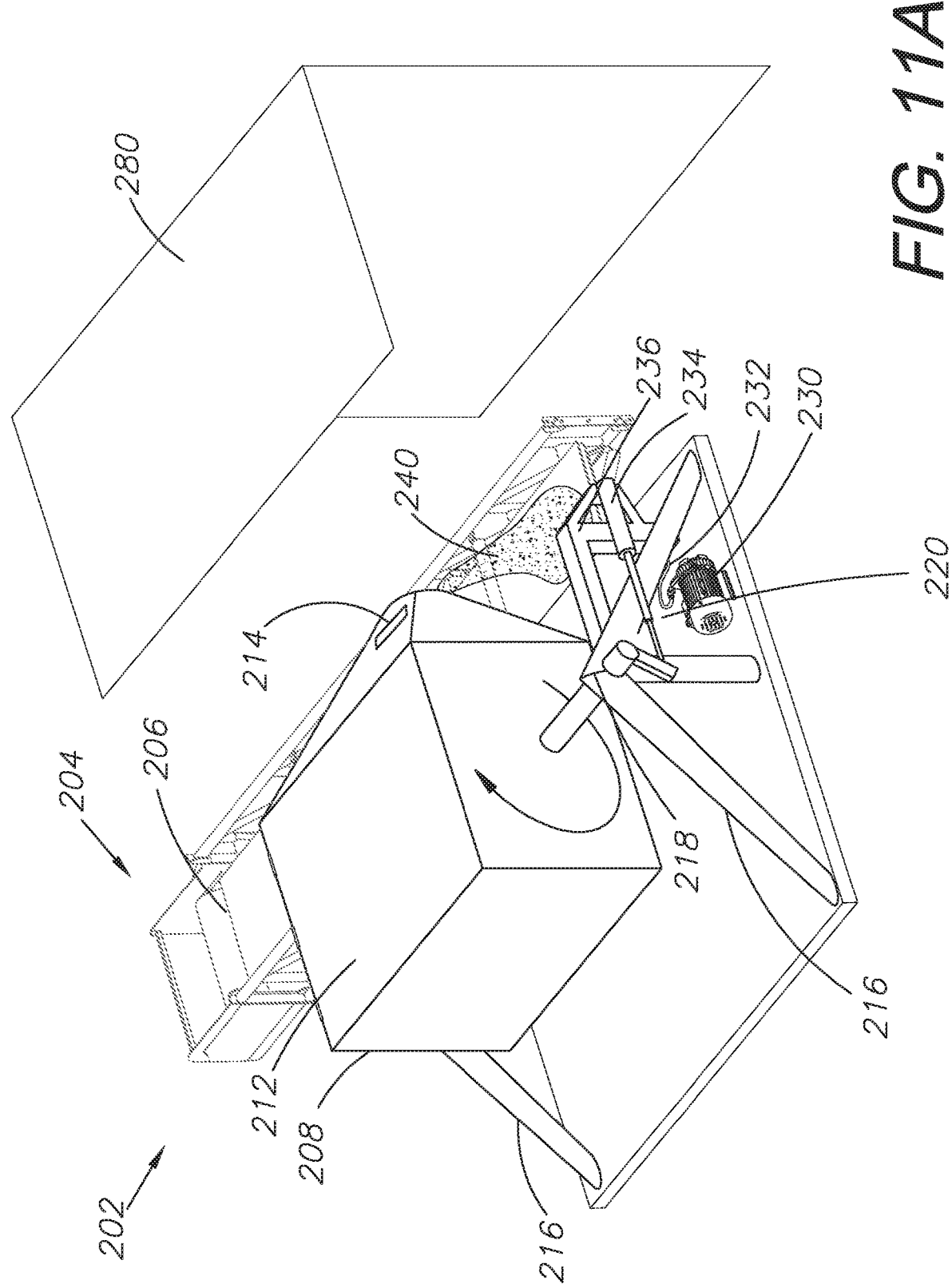

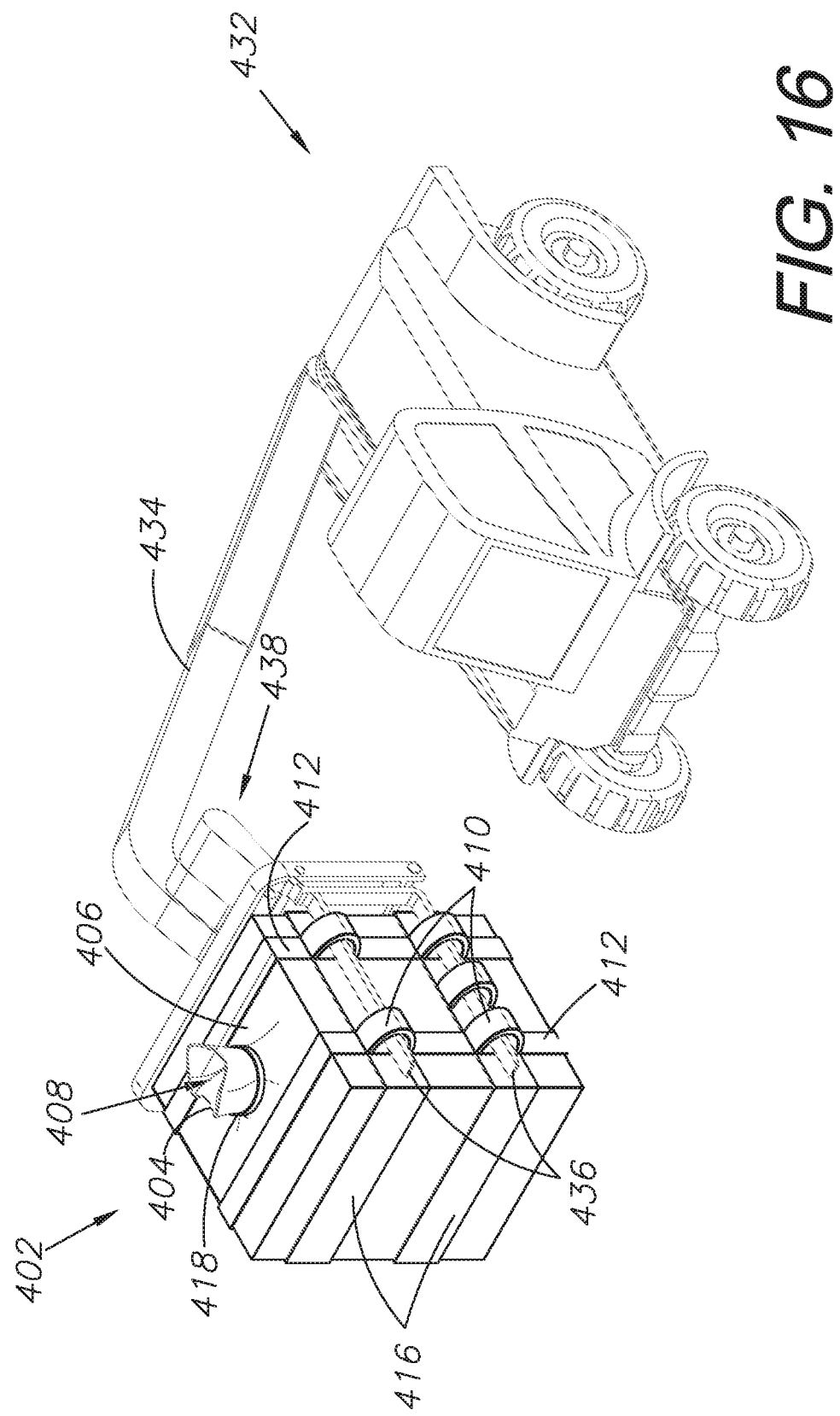

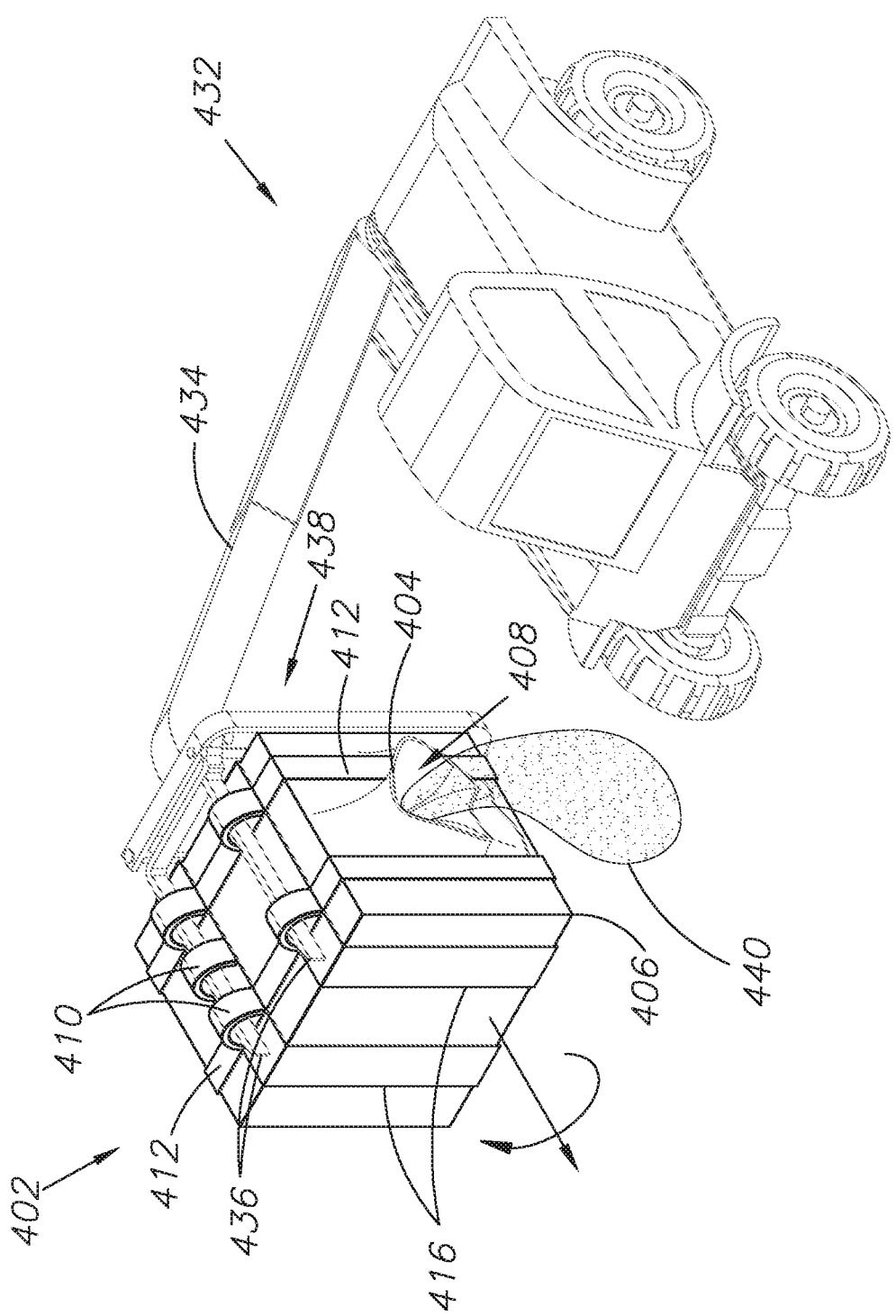

LIGHTWEIGHT TRANSPORT, STORAGE AND DELIVERY SYSTEM

CROSS-REFERENCE TO RELATED APPLICATION

This application claims priority in U.S. Provisional Patent Application No. 62/633,057, Filed Feb. 20, 2018, and U.S. Provisional Patent Application No. 62/767,675, Filed Nov. 15, 2018, both of which are incorporated herein by reference.

BACKGROUND OF THE INVENTION

1. Field of the Invention

The present invention relates generally to a transportation system for dry bulk or granular substances such as proppant or sand and method for use thereof, and more specifically to a lightweight, flexible, inexpensive material container for the purpose of storage and/or transport of bulk material or storage and transporting sand and/or proppant to fracing sites.

Additionally, this invention relates to large, box-shaped, cargo bags, typically one cubic yard or larger in capacity, of the type which are used for handling and transporting commercial quantities of dry bulk cargo. Dry bulk cargo refers to dry, or low moisture, powdered, granular or pelletized products such as grains, fertilizers, chemicals, etc. which are substantially free-flowing, when in bulk form. Very large quantities of free-flowing dry bulk cargo, such as grains, fertilizers and chemicals, typically are transported by means of tankers, barges, hopper cars, etc. However, intermediate quantities of such chemicals, from a few cubic feet to a few cubic yards, typically are handled as bagged or boxed cargo. One type of heavy-duty bag for handling such intermediate quantities of dry bulk cargo which has become increasingly popular in recent years is six sided (four sides plus a top and bottom), generally rectilinear, and formed of a heavy woven fabric, which can be a man-made fiber, but more typically is a polymer, such as woven polypropylene fiber. Such bags typically hold about one or more cubic yards of dry bulk cargo and can be handled by readily available equipment such as forklifts and transported in conventional trucks or cargo containers

2. Description of the Related Art

In the process of acquiring oil and/or gas from a well, it is often necessary to stimulate the flow of hydrocarbons via hydraulic fracturing ("fracing"). The term "fracturing" refers to the method of pumping a fluid into a well until the pressure increases to a level that is sufficient to fracture the subterranean geological formations containing the entrapped materials. This process results in cracks and breaks that disrupt the underlying layer to allow the hydrocarbon product to be carried to the well bore at a significantly higher rate. Unless the pressure is maintained, however, the newly formed openings close. In order to open a path and maintain it, a propping agent or "proppant" is injected along with the hydraulic fluid to create the support needed to preserve the opening. As the fissure is formed, the proppants are delivered in a slurry where, upon release of the hydraulic pressure, the proppants form a pack or a prop that serves to hold open the fractures.

Typically, in any hydraulic fracturing operation, a large amount of such proppant is required. Historically, it has been difficult to effectively store the proppant at the fracturing sites. Additionally, it has been found to be rather difficult to effectively transport the proppant to the desired location. Often, proppant is hauled to the desired locations in pneumatic tankers, box type containers or on the back of trucks and is dumped on site. If dumped on site, the proppant is often exposed to adverse weather conditions. This will effectively degrade the quality of the proppant during its storage. The storage of proppant on site or at the storage facilities require costly storage containers or boxes requiring a large capital investment in the storage containers. The unloading of such storage facilities is carried out on a facility-by-facility basis. As such, there is a need to be able to effectively transport the proppant to and store the proppant in a desired location adjacent to the hydraulic fracturing location.

Existing and commonly used systems for transporting and delivering proppant to well sites are all made of steel and are inherently heavy in weight and the weight of the containers lessons the amount of sand that can be hauled with in the 80,000 lb highway limit. These current methods of container delivery are also relatively costly. A lighter weight system such as the present invention could allow for up to 20% more sand to be hauled per truck. Up until now the proppant storage and deliver containers in use have also proved too costly to be used for inter modal transport and or longer-term storage. The mine to well proposition of the legacy steel box systems has not been realized due to the steel containers relatively high cost. In addition, the present legacy containers, due to their height and higher center of gravity, typically require expensive drop deck type of trailers rather than the less expensive and more available flatbed trailers. In addition, the present systems need to be weighed to determine their load. The present systems sometimes come back from the well with sand still contained in them because the operator of the fork truck cannot readily determine whether they are empty.

Further increasing expensive, if a truck delivers sand to a site and cannot immediately unload, then the operator is charged demurrage for waiting. It is common at many frac sites for a number of trucks to be waiting in line to be unloaded, for which the operator is being charged demurrage. It is important that as soon as the sand is delivered to the frac site, that it can be immediately unloaded to eliminate a demurrage charge Further complicating the entire process, the type of sand used in fracing is also very critical. The sand should have high quartz content so that it will not crush in the cracks of the formation, but will hold the cracks open. The deeper the well, normally the more quartz content that is required. In order to get the appropriate types of sand, fracing companies have to purchase it throughout the world. For example, in deep wells in South Texas, the good quality fracing sand comes from such places as the States of Wisconsin and Illinois or countries such as China. From other countries, the sand is delivered to the United States by ship and is handled at multiple locations in multiple ways with very inefficient supply chain logistics for the handling of the fracing sand. The more times the fracing sand is handled, the more expensive it is to the individual fracing company and to the well operator. This is passed along to the consumer in the increased price of gasoline Traditionally, flexible intermediate bulk containers (FIBCs) had to be transported with lifting straps that were attached to the forks of a fork truck above the top of the container or pallets that were cumbersome and inefficient. Traditional Lifting straps required the fork operator or someone to attach the straps to his forks and then have a spotter watch so that he does not endanger anyone when moving the container. Pallets add an additional cost and weight and are limited by the amount of weight they can hold.

Existing FIBCs have a chute that opens on the bottom of the container for emptying the FIBC. This limited the amount of weight a FIBC could hold as the bottom chute was prone to failure because of the weight. This bottom chute also increased the risk to the user as the operator would need to open the bottom cute and risked being crushed by its contents.

FIBCs up to now have not had strengthening straps that run horizontally around the sides of the container. And are there for subject to puncture in that area not covered with a strengthening strap and are subject to more bulging of the sides of the container in those areas when the container is filled.

FIBCs up to now did not have lifting straps that ran over the top side of the container and heavy materials can not readily be held in the upside-down position with failure of the container.

FIBCs up to now that carried heavy weights had to be ruptured or punctured to unload their contents resulting in the container a use once and throw away system which is more costly.

Up until now many bulk transport systems do not provide a sealed containment system that limits the contamination of the contents of the system when discharging.

Up until now the current proppant steel box systems the user many times does not know if the container is completely discharged.

Up until now the steel box systems used to transport frac sand are heavy and range in weight 7,000 lbs each for a two box per truck system to 12,000 lbs for a single box per truck system.

Heretofore there has not been available a system or method for bulk material or proppant storage, transport, and/or delivery with the advantages and features of the present invention.

BRIEF SUMMARY OF THE INVENTION

The present invention generally provides reusable, flexible, lightweight, low cost flexible intermediate bulk containers (FIBCs) for the delivery of granular material for fracing that will allow the transport of higher weights of sand per truck load. It is another object of the present invention to provide a delivery system that can facilitate the unloading of sand in to many of the present systems currently in use. It is still another object of the present invention to provide a low-cost storage system for the inter-modal or distributed storage locations. It is another object of the present invention to provide low cost reusable containers that can carry sand all the way from the quarry to the ultimate destination of a fracing site without repeated handling of the sand. It is another object of the present invention to efficiently and safely transfer and discharge an FIBC with a single fork truck or lifting and moving mechanism, without the need for peripheral equipment. It is another object of the present invention to efficiently move and handle FIBCs using automated equipment.

The bag would consist of a nylon or other high strength fabric with or without a flexible HDPE (High Density Polyethylene) outer layer container which may have dimensions of approximately 6 ft.×6 ft.×6 ft, although size can vary, and in the case of a frac container, has a strengthening strap with a water proof inner liner therein to carry fracing sand. Alternatively, a lightweight, rigid plastic or lightweight container with or without strengthening members, and optionally including a zipper top or plastic zipper cover, or combination of a strong zipper cover with a weaker cover or fastener that opens on its own when the weight of the contents puts force against it as when the container is tilted for emptying, may be provided in the top of the container and optionally include support members that keep the flexible sides of the container upright when filling. These could be shipped with or without the use of pallets.

The low-cost container may be taken directly to the bulk material loading site or to the quarry and loaded with bulk material or sand. The low-cost container can then move through all of the normal modes of transportation including ship, barge, rail or by truck, all the way to the frac site or to where it is needed. The bulk material or sand never has to be handled again. All that has to occur is the low-cost container is moved from one mode of transportation to another (i.e., ship-to-rail-to-truck) as it moves from its origin to its final user or from quarry to the frac site.

These containers have the advantage of being stackable using any conventional means, either prior to transit or after being unloaded at the frac site. This eliminates the demurrage of waiting to unload sand into bulk sand containers at the site. When unloaded, the can be lifted or the side of the container felt by a worker's hand pressure to the lower side of the container to determine that it is empty.

The container may include a spout or a spout attachment, and the spout would include a water tight seal with the discharge container. A water tight loading hatch is also included for the loading of sand or proppant into the container. A preferred embodiment would be sized for lifting using smaller fork lifts or cranes for movement about a site or for loading onto a transport truck. An embodiment would be suitable to have four 13,000 lb or more containers of proppant be possible to be loaded onto a single trailer.

An embodiment may also include a loading mechanism with or without extra side supports to support heavier loads for turning the containers up to 180 degrees such that the proppant can exit the container by gravity when discharging from the top side of the container.

An embodiment of the invention may be capable of loading proppant from FIBCs into legacy pneumatic or box frac sand well site delivery systems.

A container marking system may be included which allows the containers to be loaded by volume. This allows the loader to look and/or feel by touching the container to determine if it has been filled to the desired level or emptied to a desired level. The numbers could indicate by sand weight by volume (e.g. 2, 4, 6, 8, 10, 12, and 13) in thousands of pounds or kilos determined by the density of the material. Gravel would have different number scale because in has a different density. An FIBC could have multiple different scales printed op it's sides for different materials.

A loading system may be included which raises and tilts the containers to an angle such that they can be emptied by gravity.

A device may be included which allows the containers to be loaded at a loading facility using a conveyor belt while the container is preferably held upright for loading.

An object of the present invention is the ability for a fork truck to easily engage and lift the FIBC without assistance and to transport the FIBC at a low height, similar to is if it was carried on a pallet. This can be done without the need for a pallet. An additional object of the present invention is the ability to discharge an FIBC by rotating it to a downward position using the fork truck such that it unloads by gravity from its top.

BRIEF DESCRIPTION OF THE DRAWINGS

The drawings constitute a part of this specification and include exemplary embodiments of the present invention illustrating various objects and features thereof.

FIG. 11A is a three-dimensional isometric view thereof shown in an unloading orientation.

FIG. 16 is a three-dimensional isometric view thereof shown in a raised orientation with a fork truck.

FIG. 17 is a three-dimensional isometric view thereof shown in an unloading orientation.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Proppant Container System 2

Figure 1:
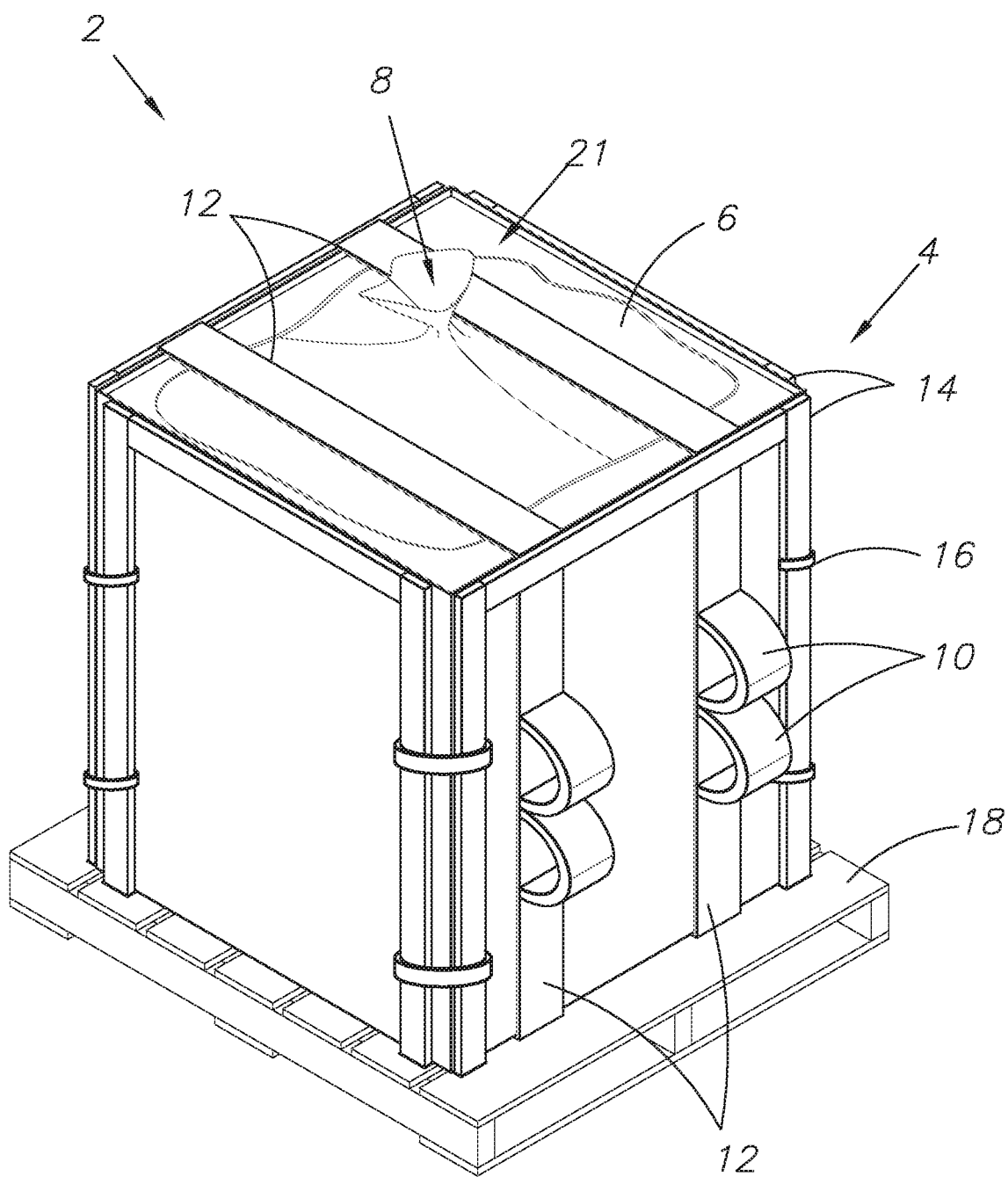
FIG. 1 is a three-dimensional isometric view of a first embodiment of the present invention.
Figure 2:
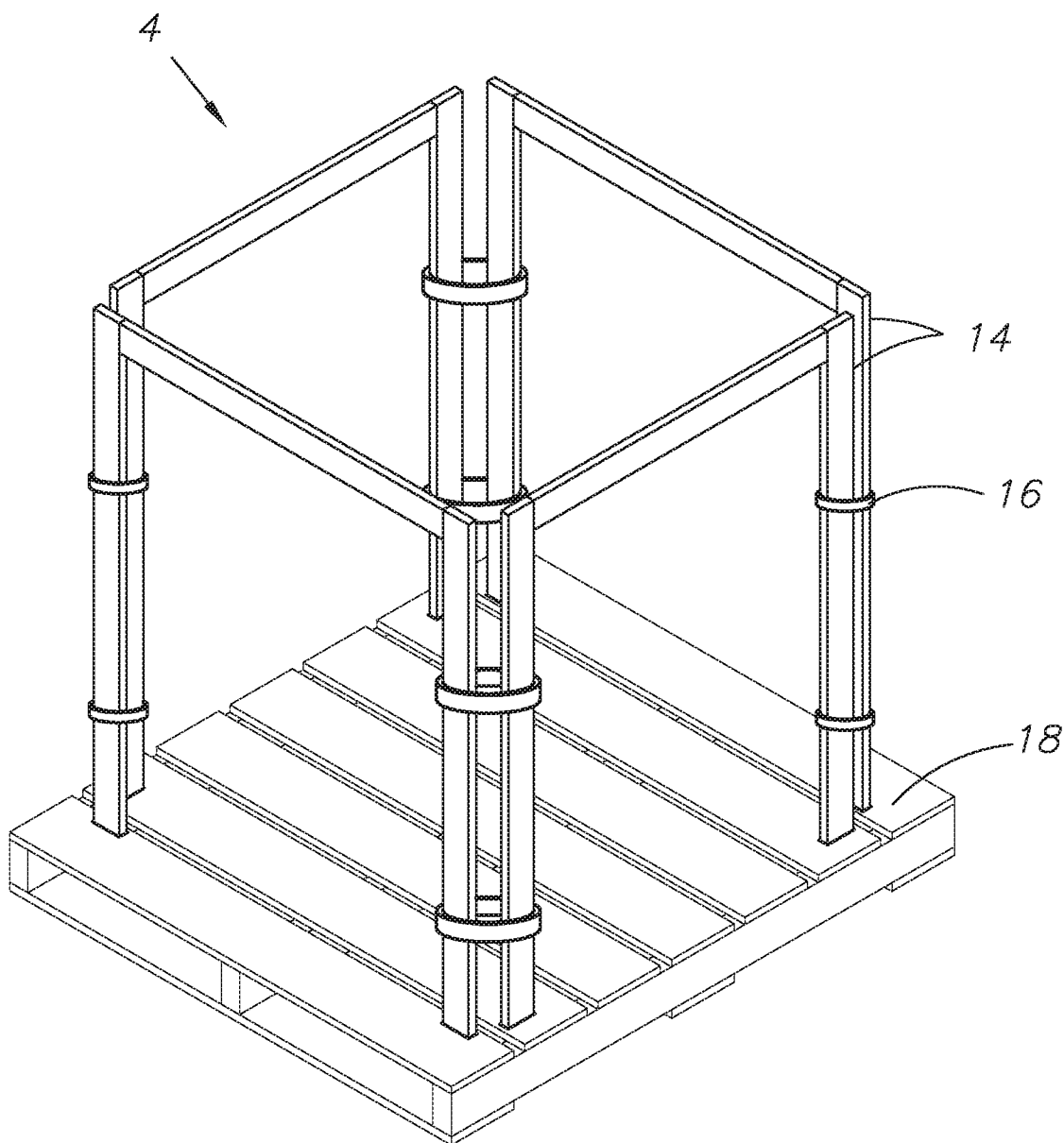
FIG. 2 is a three-dimensional isometric view of frame elements thereof.

FIG. 1 shows a preferred embodiment proppant container system 2 for containing proppant for fracing purposes, such as sand. The embodiment consists of a reusable, flexible, lightweight, low cost flexible intermediate bulk container (FIBC) 6 which stores the proppant. The proppant is inserted into the container via an opening 8, which is then secured using a tie or other suitable closure. The FIBC material could be heavy weight high strength nylon fabric or other suitable materials.

A rigid frame 4 is shown about the container 6 to secure it for transport and to prevent damage to the container. The frame consists of side frame members 14 which enclose the container 6. The container 6 is accessible via a top opening 21 of the frame 4. Straps 16 connect the side frame members 14 together.

Lifting loops 10 designed for receiving connections from a crane or forklift are secured to the frame 4. These loops 10 are connected to the frame 4 via lifting straps 12 which can wrap around underneath the container 6 and constrains the container 6 about the top end which prevents the container 6 from exiting the frame 4 when the frame is tilted to empty the container.

Figure 3:
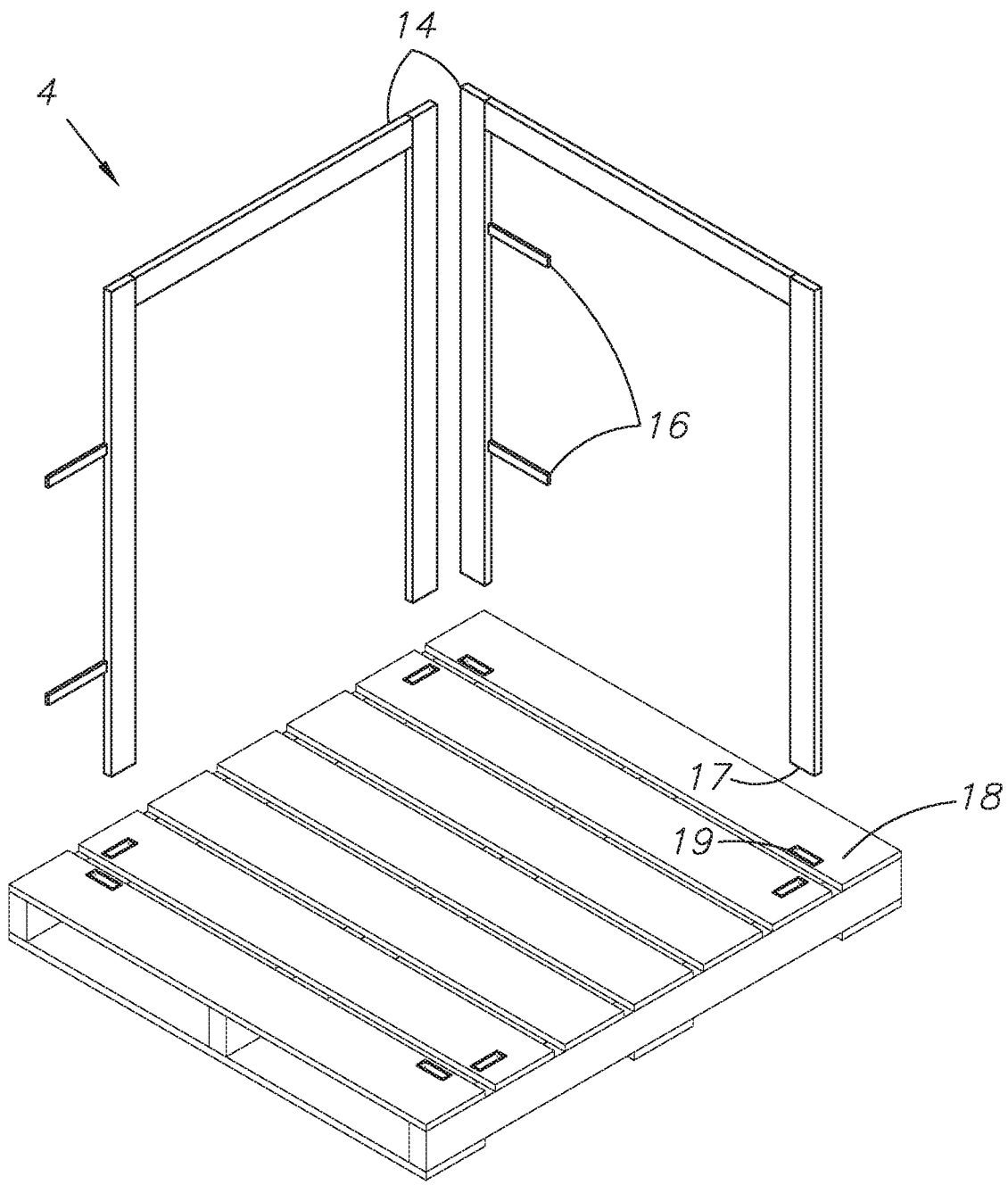
FIG. 3 is another three-dimensional isometric view of frame elements thereof.

FIG. 3 shows that the pallet 18 may have slots 19 for receiving the bottom ends 17 of the frame elements 14 to further secure the entire assembly together.

III. Alternative Embodiment Proppant Container System 52

Figure 4:
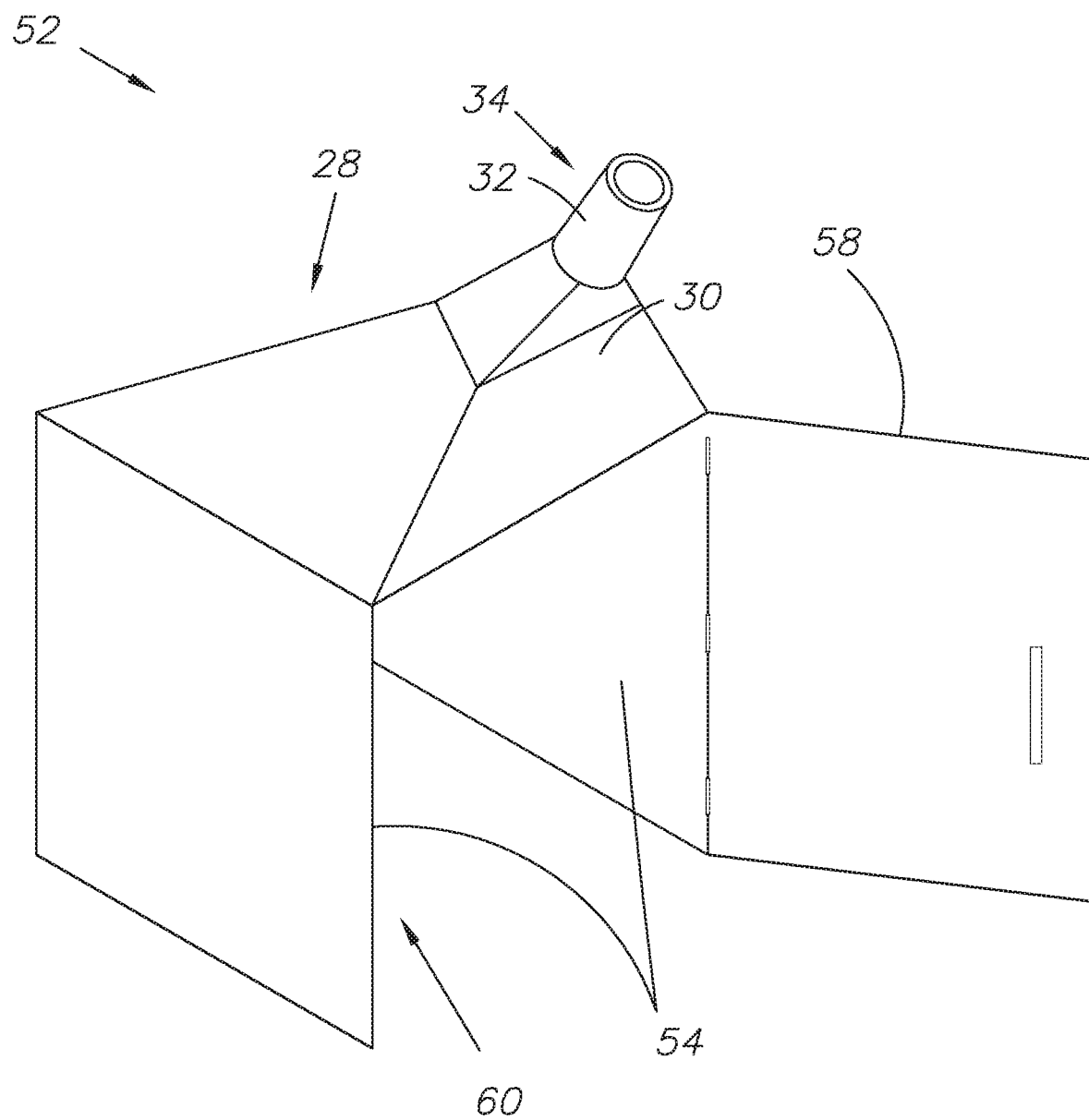
FIG. 4 is a three-dimensional isometric view of another alternative embodiment of the present invention.

FIG. 4 shows an alternative embodiment proppant container system 52 which has an external housing consisting of four three side walls 54 and a door 58 which define an interior space 60 for storing the proppant, either loose or in an FIBC as described above. The funnel assembly 28 has a housing 30 which can be deployed on top of the three side walls 54 and door 58. The spout 32 is located on the same side of the container system 52 as the door 58, and extends out over the door.

Figure 5:
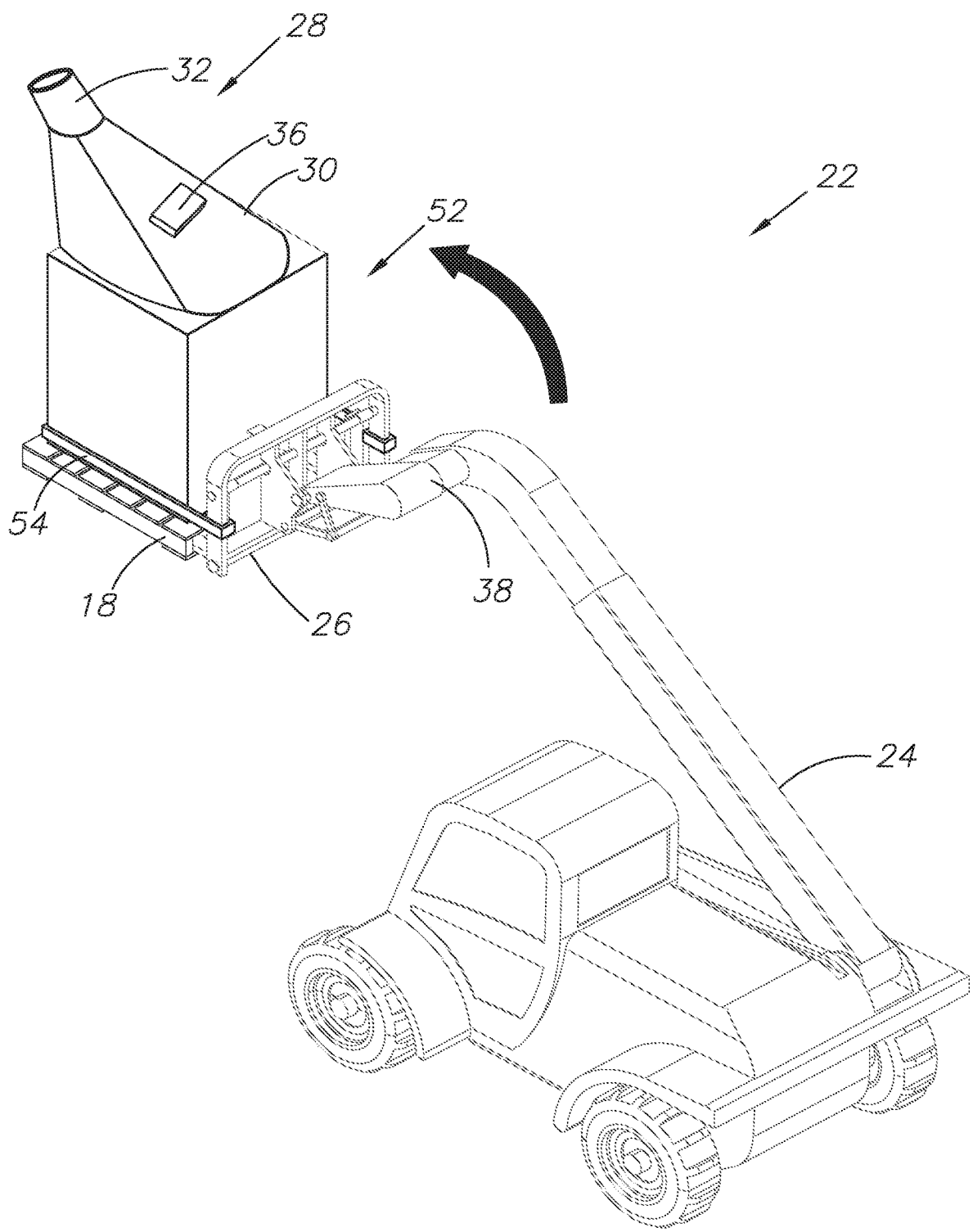
FIG. 5 is a three-dimensional isometric view thereof shown in a raised orientation with a fork truck.

FIG. 5 shows the proppant container system 52 used in an unloading configuration 22 where the system 52 is lifted by a fork truck 24 having a pivotable arm assembly 38. A funnel assembly 28 is connected to the top opening of the proppant container system 52. This allows the container 6 to be safely and efficiently unloaded via the spout 32 opening 34 of the funnel assembly 28. A vacuum pump 36 within the funnel assembly 28 allows for the removal of dust within the assembly. A strap 54 secures the container system 52 to the carriage 26 of the fork truck 24.

Figure 6:
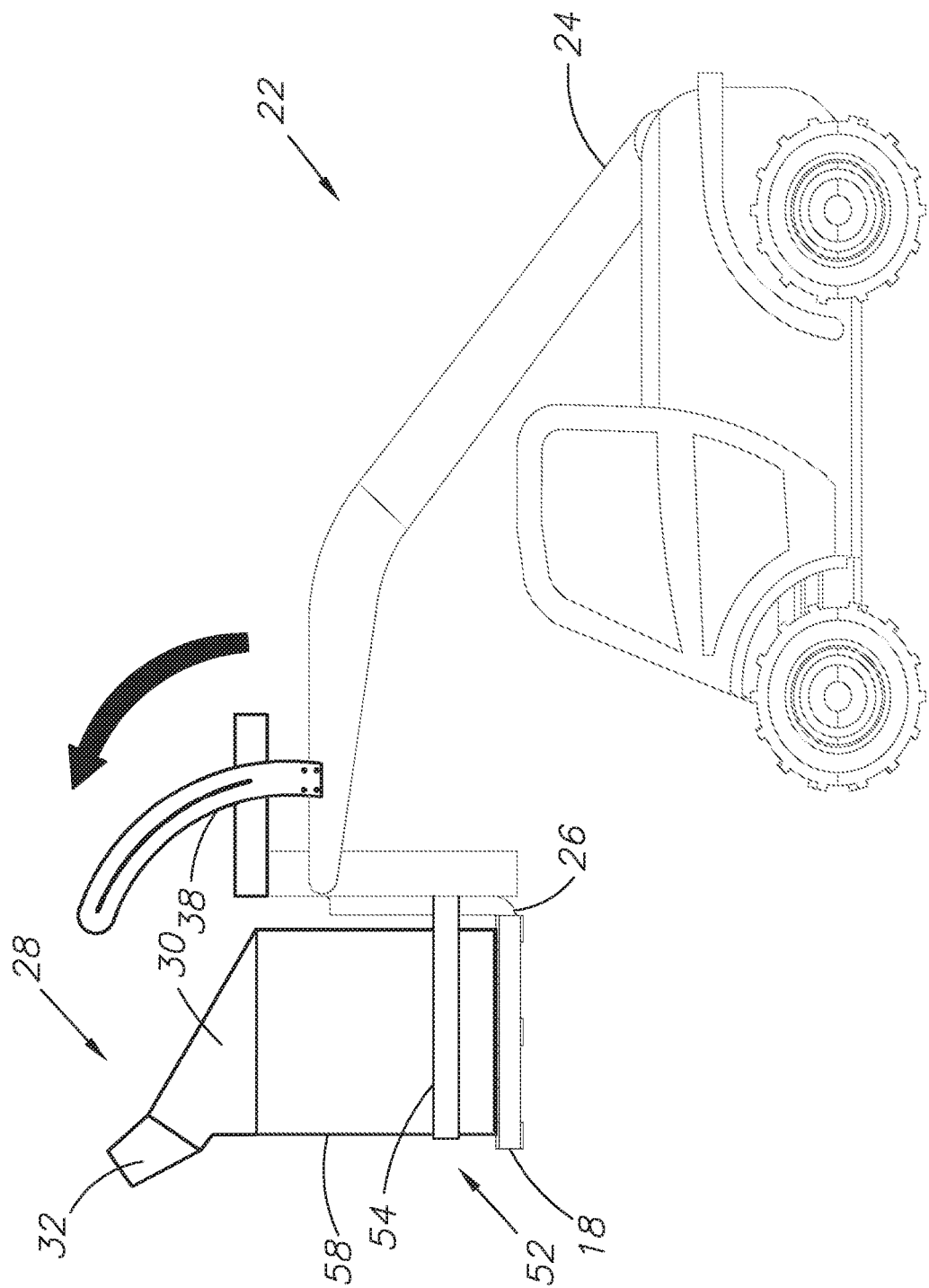
FIG. 6 is a side elevational view thereof.

As shown in FIGS. 5 and 6, the container system 2 is lifted by inserting the carriage 26 of the fork truck 24 through the pallet 18.

Figure 7:
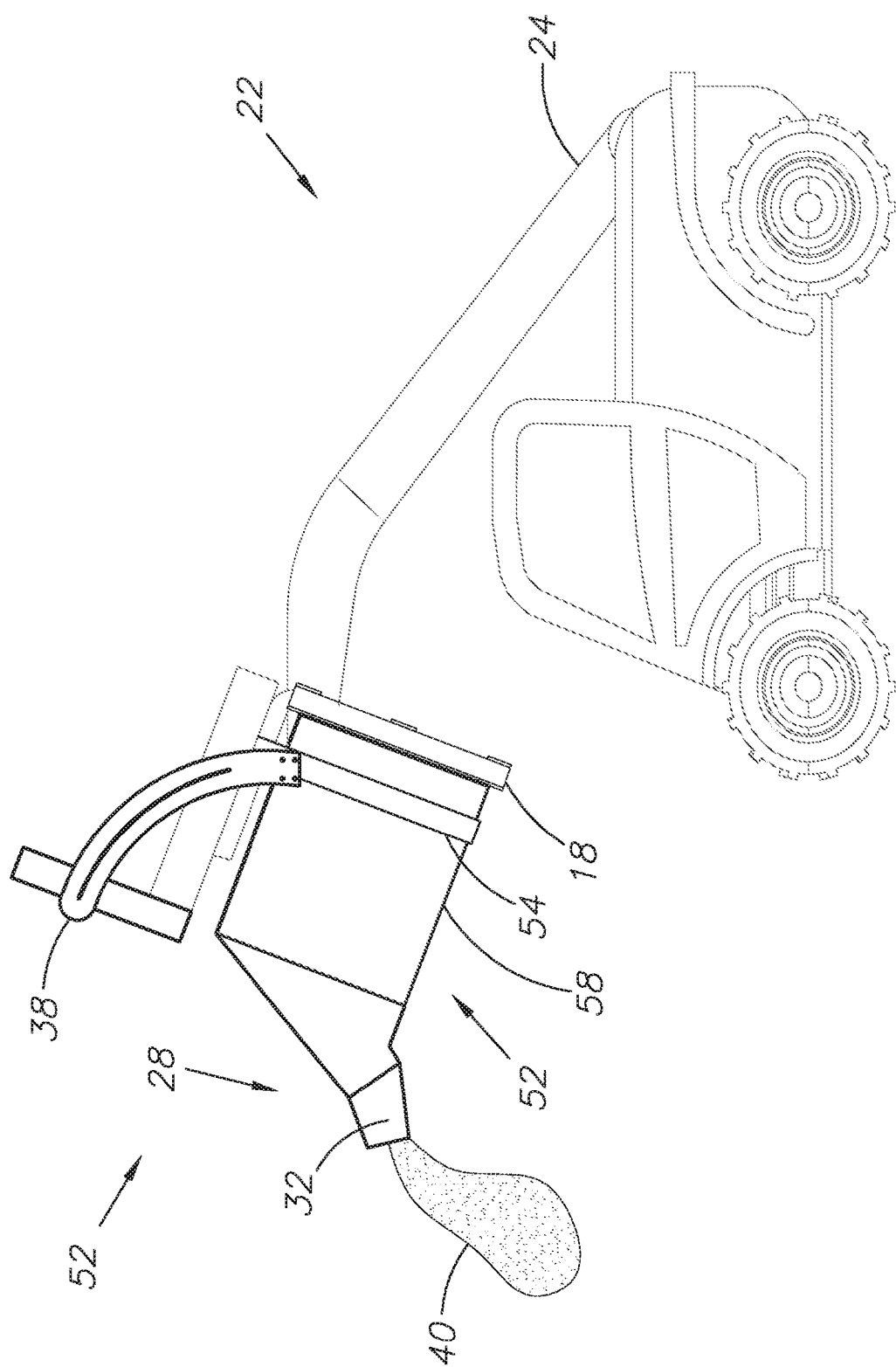
FIG. 7 is a side elevational view thereof shown in an unloading orientation.

FIG. 7 shows how the entire container assembly 2 can be tipped down by the pivotable arm assembly 38 to empty the proppant 40 from the funnel assembly 28. The assembly can tilt up to 180 degrees preferably.

IV. Alternative Embodiment Proppant Container System 102

Figure 8:
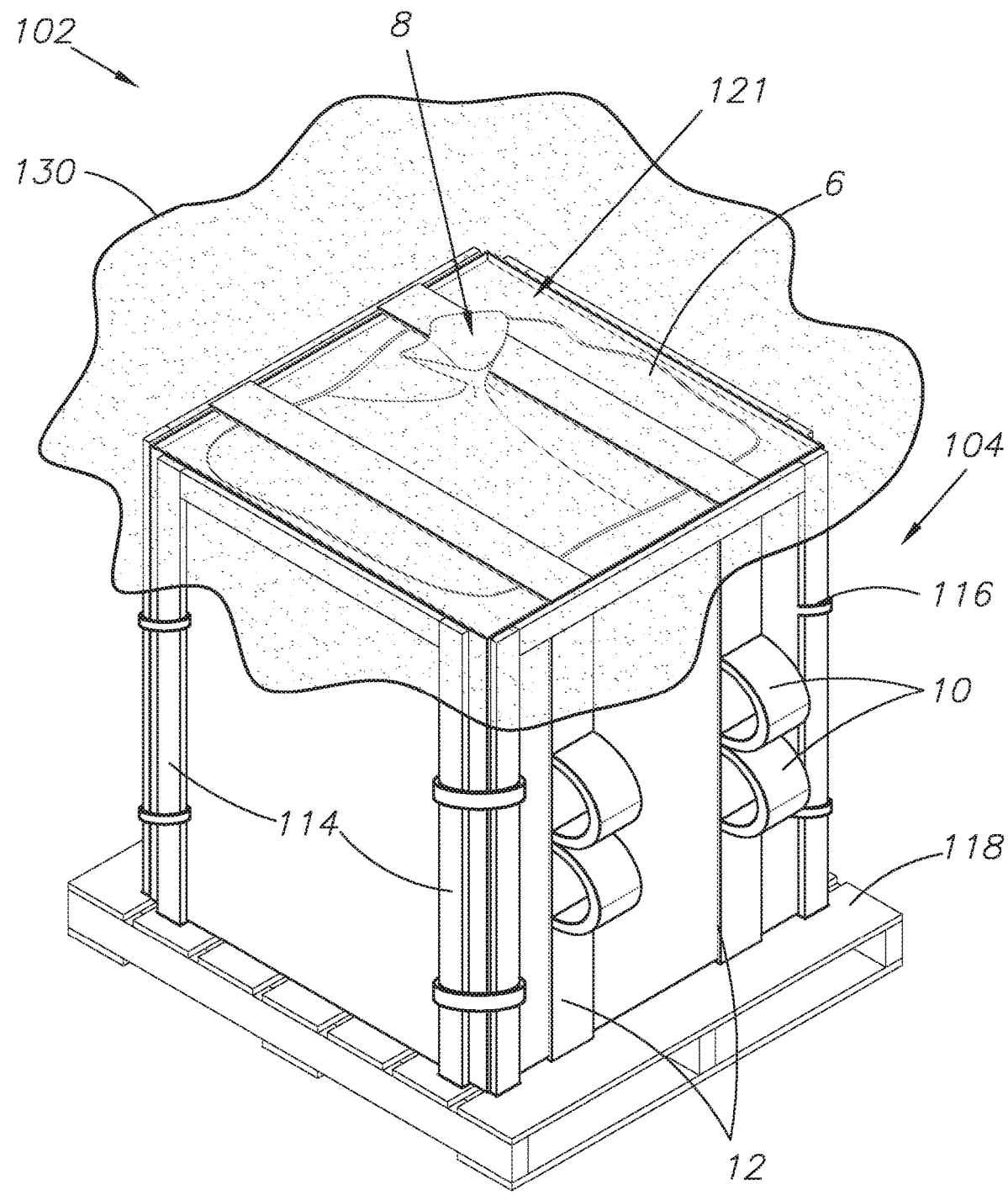
FIG. 8 is a three-dimensional isometric view of yet another alternative embodiment of the present invention including a covering.
Figure 9:
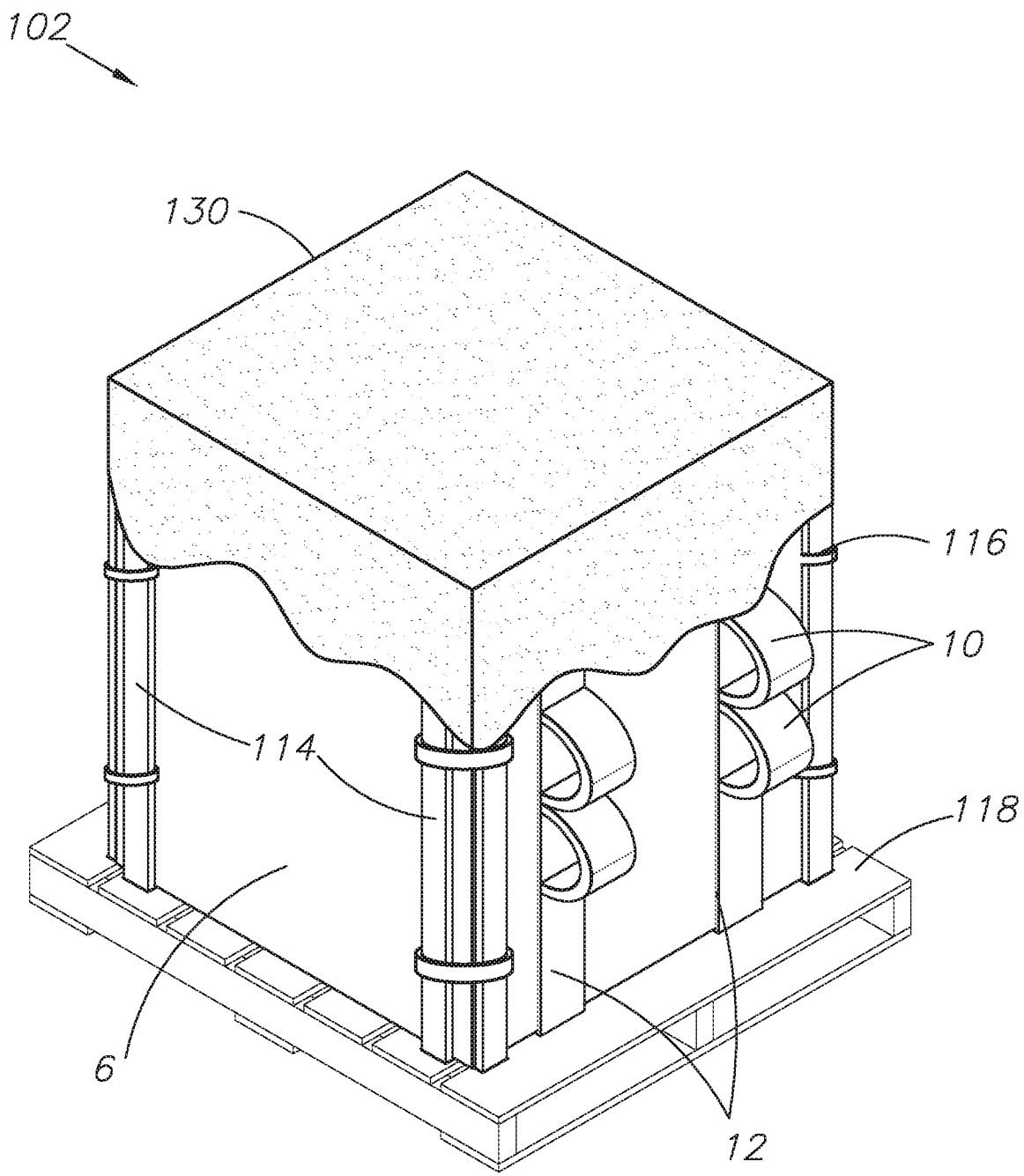
FIG. 9 is another three-dimensional isometric view thereof shown in a covered orientation.

FIGS. 8 and 9 show another alternative embodiment proppant container system 102 which contains a similar enclosure to the first embodiment described above. However, these show a frame 104 which does not insert into the pallet 118. Otherwise, the frame and container 6 could be identical to that embodiment.

As before, the rigid frame 104 is built about the container 6 to secure it for transport and to prevent damage to the container. The frame consists of side frame members 114 which enclose the container 6. The container 6 is accessible via a top opening 121 of the frame 104. Straps 116 connect the side frame members 114 together. The same lifting loops 10 and straps 12 can be used in this embodiment.

A cover 130 can be secured about the top opening 121 of the frame 104. This cover 130 would protect the container 6 within the frame 114. It could be secured to the frame 104 using tie downs, clasps, a large elastic band, or other suitable devices.

V. Alternative Embodiment Proppant Container System 152

Figure 10:
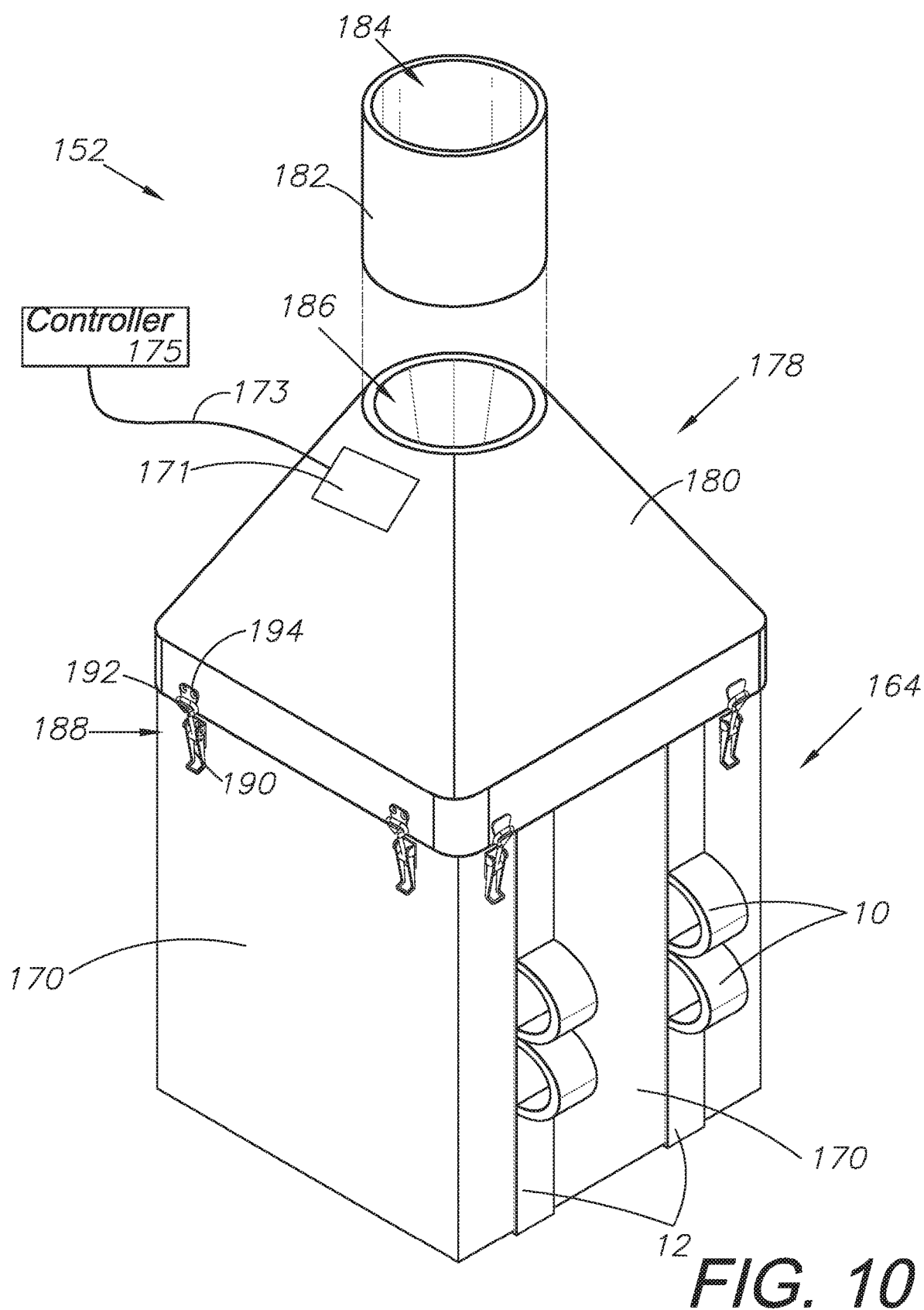
FIG. 10 is a three-dimensional isometric view of yet another alternative embodiment of the present invention.

FIG. 10 shows another alternative embodiment proppant container system 152 which has a frame 164 formed from four side walls 170 and a floor 172. A funnel system 178 with a spout 182 can be connected to the top of the container 164 using clips 188 with claps 190 located on the walls 170 of the container 164 having hooks 192 for connecting into receivers 194 on the wall 180 of the funnel system 178. The spout 182 includes an opening 184 for discharging bulk material or proppant from the container 164 through the funnel assembly 178. The spout may be selectively removable and adjustable about an opening 186 on the wall 180 of the funnel system 178. A gate valve 171 can be used to open and shut the spout 182 as desired. A controller 175 is connected via control wire or hose 173 to the gate valve 171 and may be remotely connected to the gate valve. Lifting straps 12 with lifting loops 10 as discussed above may or may not be used.

VI. Alternative Embodiment Proppant Container System 202

Figure 11:
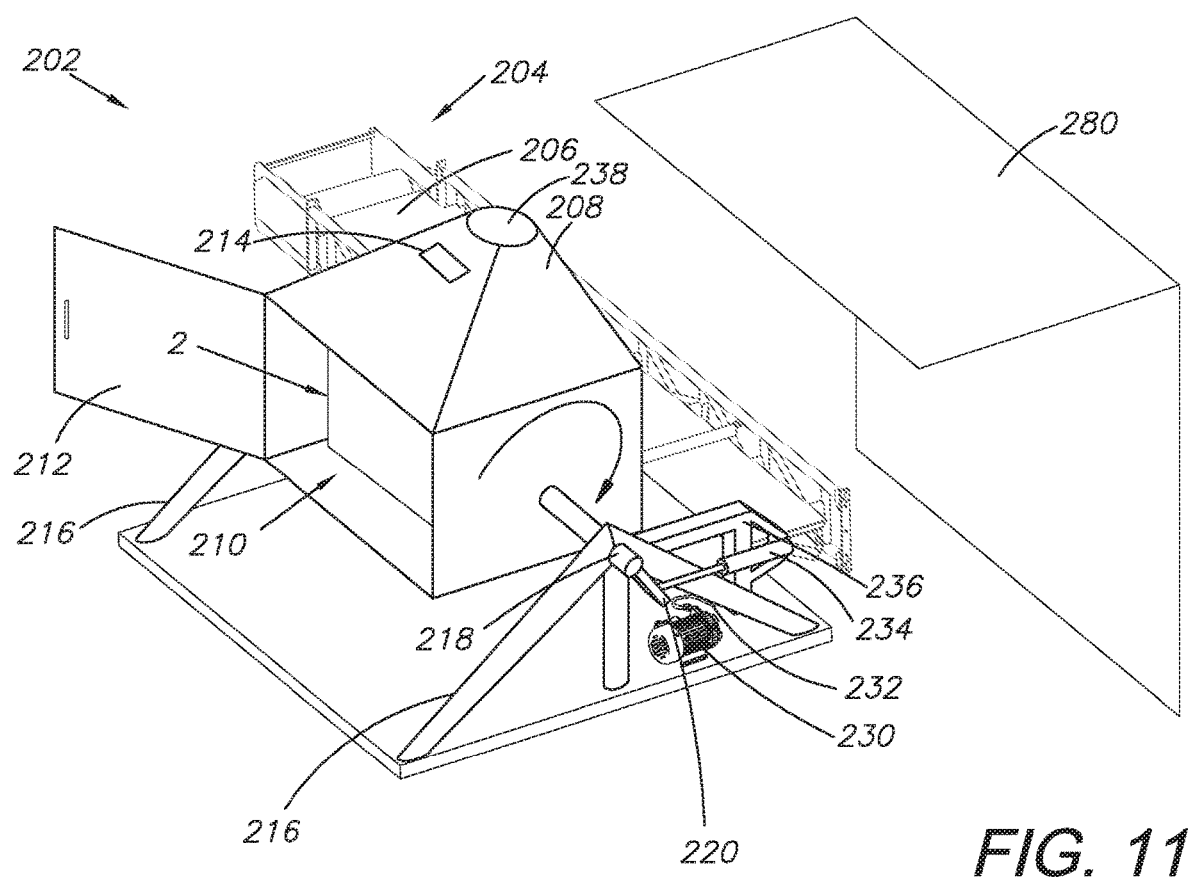
FIG. 11 is a three-dimensional isometric view of a conveyor unloading system which forms another embodiment of the present invention.

FIG. 11 shows a proppant container system 202 for loading proppant containers as described throughout this application. The system 202 has a conveyor assembly 204 including conveyor belt 206 for moving unloaded proppant 240 as shown in FIG. 11A. An enclosure 208 to hold container system 2 for unloading includes an interior space 210, and a door 212 for closing the interior space. A gate valve 214 opens the enclosure 208 spout 238 for emptying the container system 2 within the enclosure. A pivot frame 216 supports the enclosure and allows it to rotate about the pivot point 218. The gate valve 14 may be a Pratt® knife gate valve, provided by the Henry Pratt company of Aurora, Ill., or a similarly suited gate valve for opening and closing the spout 238.

A hydraulic piston and cylinder 234 mounted to a frame 236 can move a lever 220 to rotate the enclosure 208 about the pivot point 218. A hydraulic pump 230 connects to the frame 236 and cylinder 234 via a hose 232.

In another embodiment, multiple such enclosures 208 can be positioned along the belt 206 and on both sides of the belt such that multiple containers 6 can be emptied simultaneously.

A tent or enclosure 280 can cover the entire assembly to prevent weather from disturbing the unloaded proppant.

The conveyor 204 may be fully enclosed. A port could receive the proppant 240 from the enclosure 208 to move it into the enclosed conveyor. A rubber bumper seal would be used to seal the port, preventing dust and contaminants from contaminating the proppant.

VII. Alternative Embodiment Proppant Container System 302

Figure 12:
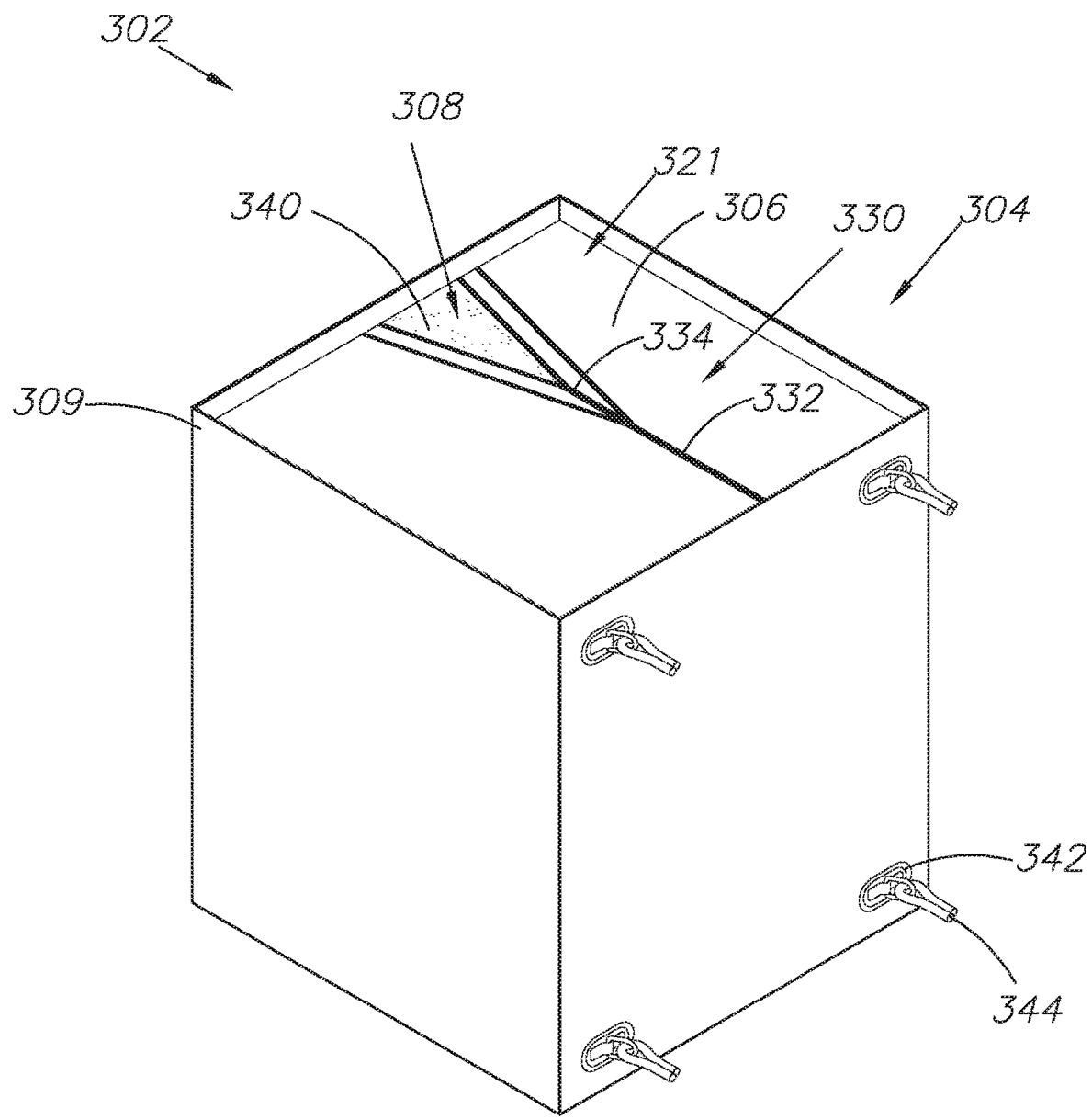
FIG. 12 is a three-dimensional isometric view of yet another embodiment of the present invention shown in a loading orientation.

FIG. 12 shows yet another alternative embodiment bulk material or proppant container system 302 where the container 306 includes a zip-top interface 330 for closing the container 306 once filled. There is an exterior zipper 332 and an interior zipper 334. In a preferred embodiment, he zippers 332, 334 are similar to that used for plastic storage bags, and prevents the elements from entering the container. The exterior greater holding-strength zipper prevents the contents from spilling out of the container 306 during transport, and is manually activated. When the top zipper 332 is opened and the container is tipped, however, the interior lesser holding-strength zipper 334 automatically will open due to the pressure of the bulk material or proppant 340 within the container, allowing the container to be emptied.

A frame 304 of structural walls 309 can be placed around the top portion of the container 306 to help when loading the container 306 via the container opening 308. The container is placed within the open space 321 between the structural walls 339. Hooks 344 affixed to latches 342 on the structural walls 309 can be used to then pull the walls away from the container 306 once filled. When filled, the container retains its shape.

Figure 13:
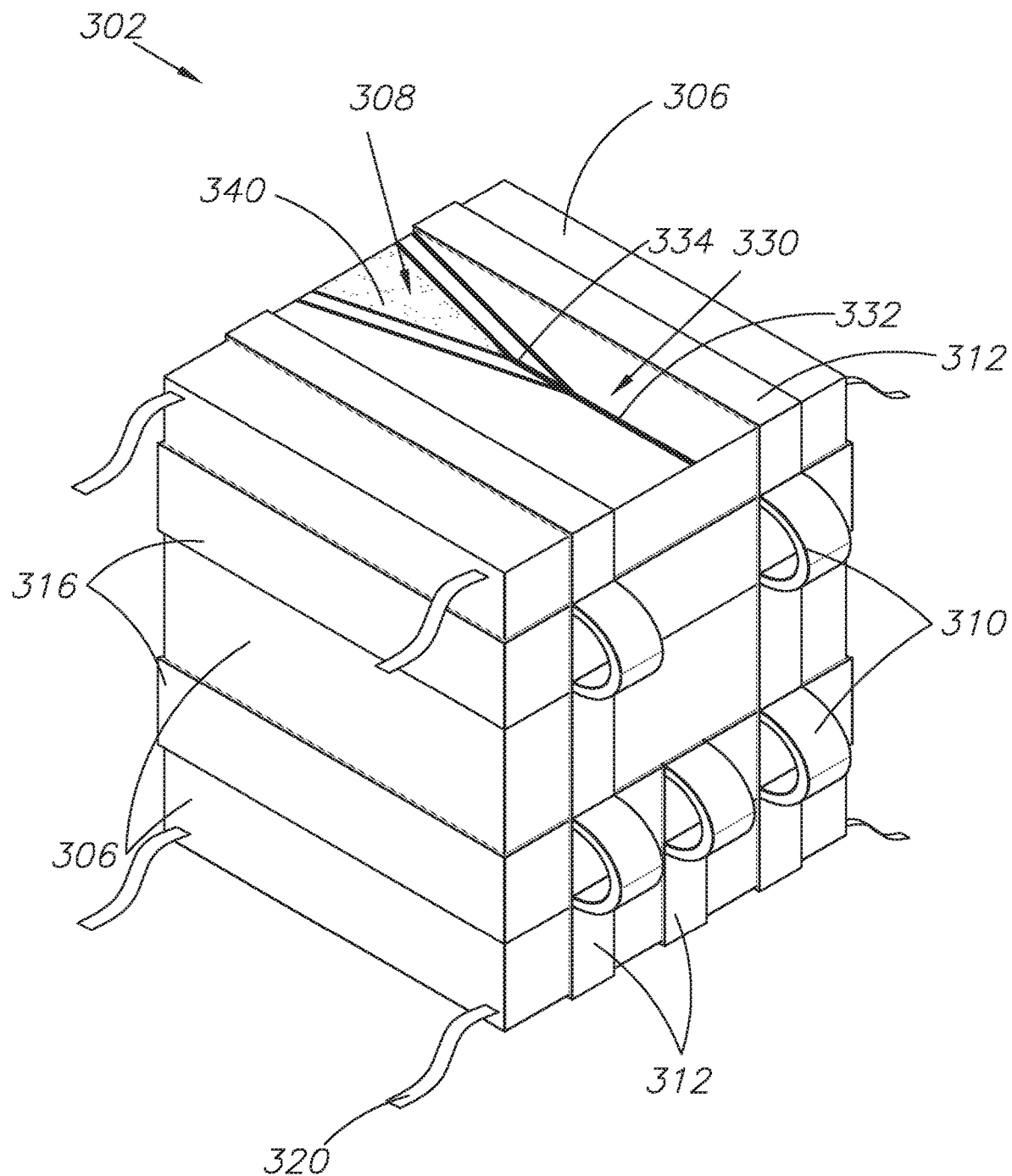
FIG. 13 is a three-dimensional isometric view thereof shown in a loaded orientation.

As shown in FIG. 13, the container 306 is secured by vertical lifting straps 312 and horizontal lifting straps 316. Several rows of lifting loops 310 separated by a distance of more than 20% of the container height allow the container to be lifted using a fork lift truck with 2 or 4 or more tines or other suitable method such that the weight of the container is supported on the weight bearing side of the container to avoid deformation or rupture. As with the previous embodiments, the container 306 can then be tilted until at an angle such that the zip-top interface 330 is forced open by the proppant 340 within the container 306, and the container is emptied.

Tie-down straps 340 for securing the container 306 during transport or unloading may be affixed to all corners.

VIII. Alternative Embodiment Proppant Container System 352

Figure 14:
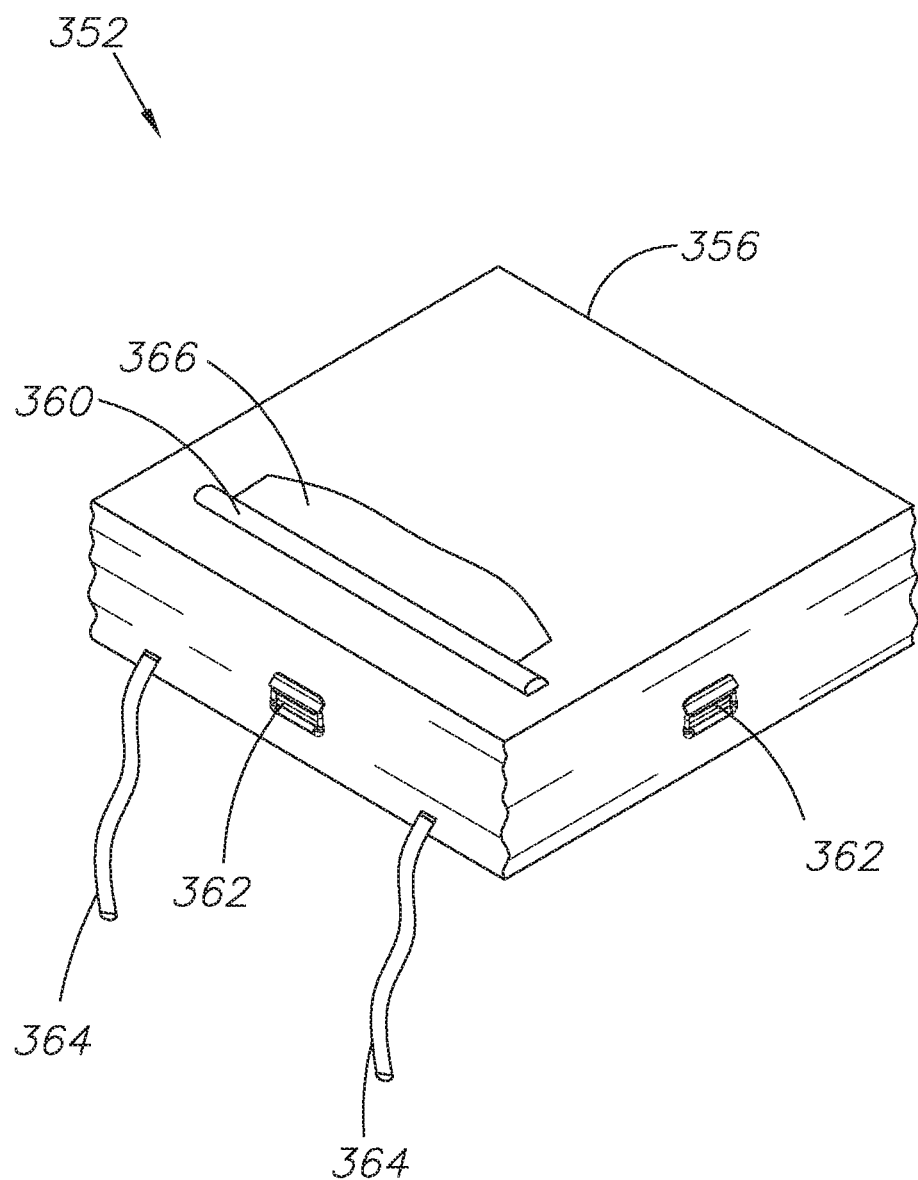
FIG. 14 is a three-dimensional isometric view of a slightly alternative embodiment of the present invention shown in a stored orientation.

FIG. 14 shows a separate container cover which is used to provide extra protection for the container when storing and also provides a means for packing and transporting the discharged container. In this embodiment, the proppant container system 352 where the container 356 has been emptied of proppant and has been compacted into a folded position. The interior of the container is visibly empty of proppant as would be viewable through its opening. Handles 362 on either side of the container 356 allow for easy carrying of the container. Straps 364 can be used to secure the container 356 into a compact orientation using buckles or other fastening elements. A pouch 360 containing a plastic bag 366 for sealing and storing the used container into for transport for reuse may also be included.

IX. Alternative Embodiment Proppant Container System 402

Figure 15:
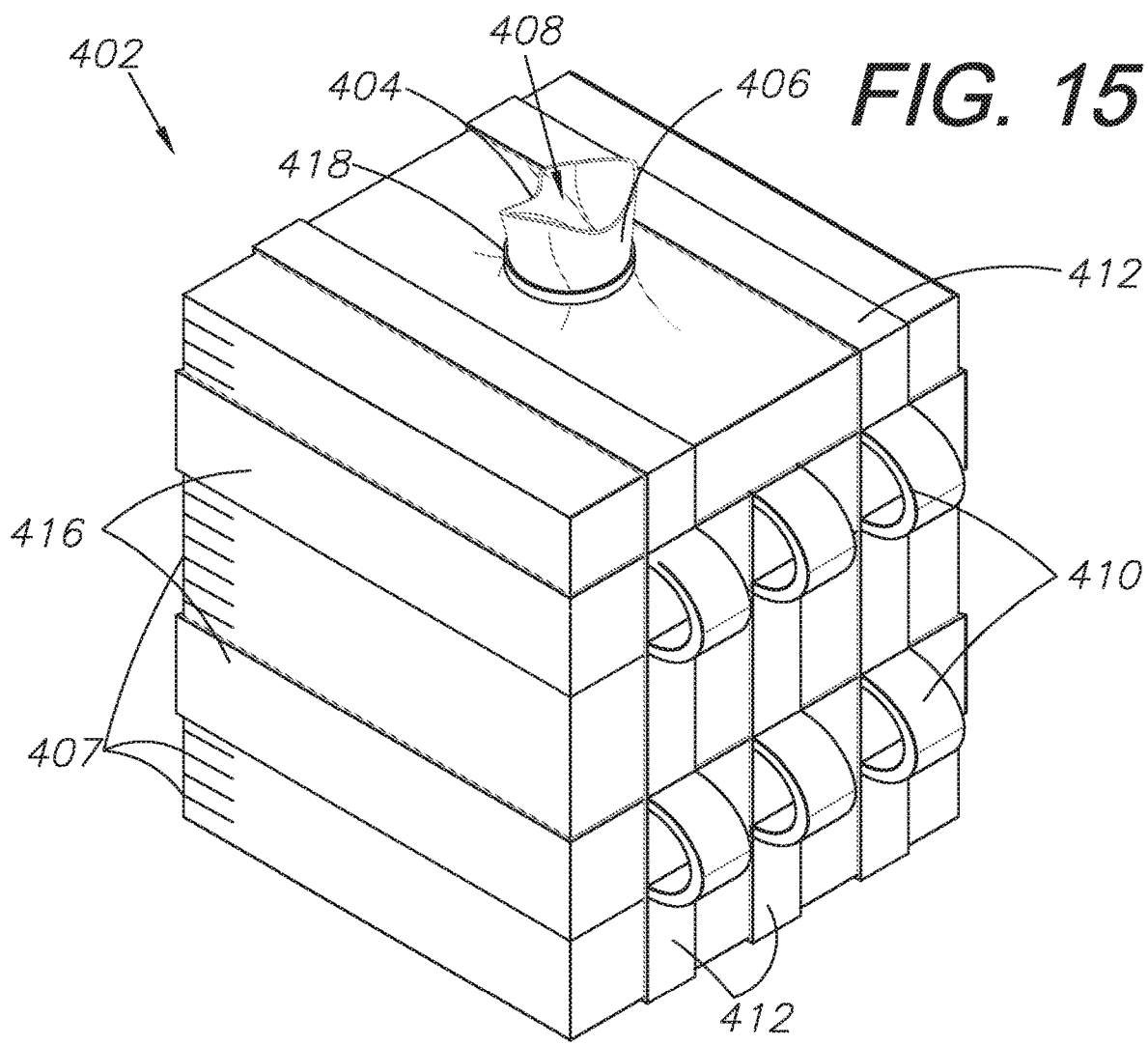
FIG. 15 is a three-dimensional isometric view of yet another alternative embodiment of the present invention.

Similar to the embodiment 302 above, FIG. 15 shows an alternative embodiment proppant container system 402 where the container 406 includes a spout 404 for filling and emptying the container. The spout may be an excess portion of the container 406 material itself which simply extends outwards and upwards from the container, or it may be a physical element which is placed around the opening 408 of the container. A spout clamp 418, which may be a tie, proprietary clamp, or other closure device, cinches the spout closed or otherwise seals the spout until the container system 402 is in position to be emptied.

The container may include markings 407 which indicate the weight of the container based on how full the container 406 is. The weight may be written or printed around these markings 407, or may be in a reference manual separate from the container system 402. The numbers could indicate by sand weight by volume (e.g. 2, 4, 6, 8, 10, 12, and 13) in thousands of pounds or kilos determined by the density of the material. Gravel would have different number scale because in has a different density. An FBIC could have multiple different scales printed on its sides for different material and designated as such materials.

The container 406 is secured by vertical lifting straps 412 and horizontal straps 416 or protective material. Two or more rows of lifting loops 410 separated by a distance of more than 20% of the container height allow the container to be lifted using a fork lift truck with 4 or more tines or other suitable method such that the weight of the container is supported on the sides of the lifting loops to avoid deformation or rupture when the container is rotated in the z axis for discharge from the top of the container. It is preferred that the lifting straps run under the container and over the top of the container. It is preferred that these lifting loops may be attached the vertical 412 or horizontal 416 lifting straps.

Figure 15A:
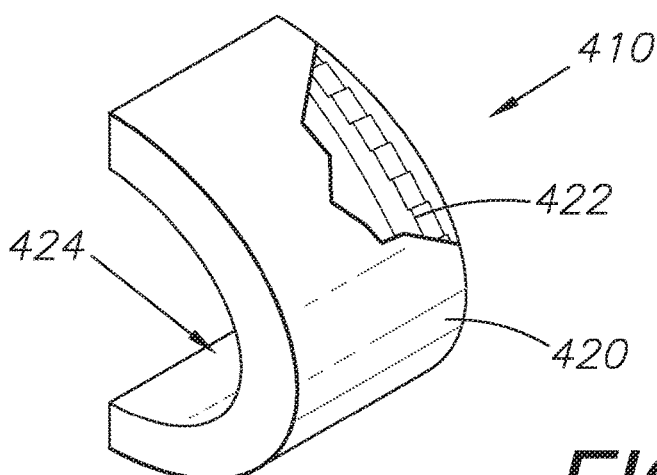
FIG. 15A is a detailed three-dimensional view of a lifting loop element thereof.

FIG. 15A shows a detailed view of one of the lifting loops 410 showing how it is a rigid lifting loop for receiving a fork lift fork or crane hook for lifting and turning the container system 402. The loops consist of a rigid external or internal structure 422, an outer layer 420 and an internal loop 424 for receiving the fork or hook. The internal structure 422 may be a spring-like material which forces the loop away from the container to keep it in an open orientation. The loop may optionally have an opening such as a buckle or a clasp to allow the user to selectively open and close the loop about an object.

FIG. 16 shows the proppant container system 402 used in an unloading configuration 432 where the system 402 is lifted by a fork truck 434 having a pivotable arm assembly 438. The container system 402 is lifted by inserting the fork 436 of the fork truck 434 through the pallet lifting loops 410.

FIG. 17 shows how the entire container assembly 402 can be rotated about an axis by the pivotable arm assembly 438 to empty the proppant 440 from the funnel assembly 438. The assembly can tilt up to 180 degrees preferably.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A bulk material containment system comprising:
a flexible container comprised of a high strength, flexible fabric configured for storing bulk material;
said flexible container comprising a top opening configured for receiving and deploying said bulk material;
said flexible container being configured to be stackable upon being filled with bulk material;
said flexible container being further configured to be lifted and tipped for deploying said bulk material at a selected location;
wherein said flexible container is collapsible to a transportable orientation upon being emptied of said bulk material;
a first lifting strap wrapped about an exterior face of said flexible container, said first lifting strap comprising a first set of lifting loops;
a second lifting strap wrapped about said exterior face of said flexible container, said second lifting strap comprising a second set of lifting loops; and
wherein each one of said set of lifting loops comprising a rigid material.

2. The system of claim 1, further comprising:
a fork lift truck comprising at least two forks and a pivotable arm affixed to said at least two forks;
said at least two forks configured for lifting said flexible container by said first and second sets of lifting loops; and
said pivotable arm configured for tilting said flexible container such that said bulk material is deployed from said flexible container from said top opening.

3. The system of claim 1, further comprising:
a funnel assembly configured to be placed about said top opening of said reusable flexible container, said funnel assembly comprising a spout for deploying said bulk material from said reusable flexible container; and
wherein said funnel assembly is removably affixed to said reusable flexible container.

4. The system of claim 3, further comprising:
a gate valve for opening said spout; and
said funnel assembly comprising a vacuum pump configured for removal of dust within said funnel assembly.

5. The system of claim 1, further comprising:
an external frame configured for being placed about said flexible container while said flexible container is being filled with said bulk material; and
wherein said external frame is removable upon said flexible container being filled.

6. The system of claim 1, further comprising tie down straps located at corners of said exterior face of said reusable flexible containers.

7. The system of claim 1, further comprising:
a spout about said top opening of said flexible container, said spout configured for filling said reusable flexible container with said bulk material and for deploying said bulk material from said flexible container;
a spout clamp about said spout, said spout clamp configured for sealing said spout; and
wherein said spout clamp is selectively removable from said spout.

8. A flexible intermediate bulk container (FIBC), further comprising:
the FIBC being comprised of a high strength, flexible fabric configured for storing bulk material;
said FIBC comprising an opening configured for receiving and deploying said bulk material;
said FIBC being further configured to deploy said bulk material at a selected location;
wherein said FIBC is collapsible to a transportable orientation upon being emptied of said bulk material;
at least one zip-top interface configured for sealing said opening of said FIBC; and
one of said at least one zip-top interfaces configured to automatically unzip upon said FIBC being positioned suitable to deploy said bulk material from said FIBC, thereby allowing said bulk material to be deployed from said FIBC.

9. The system of claim 8, further comprising:
said at least one zip-top interface comprising an outer closure mechanism and an inner zipper;
wherein said one of said at least one zip-top interfaces comprising said inner zipper; and wherein said outer closure mechanism is configured to be operated independent of the inner zipper, said inner zipper being automatically opened by said bulk material.

10. A flexible intermediate bulk container (FIBC), further comprising:
the FIBC being comprised of a high strength, flexible fabric configured for storing bulk material;
said FIBC comprising a top opening configured for receiving and deploying said bulk material;
wherein said FIBC is collapsible to a transportable orientation upon being emptied of said bulk material;
a conveyor system comprising a conveyor system configured for receiving bulk material deployed from said FIBC to a predetermined location;
an enclosure configured for receiving said FIBC, said enclosure comprising a spout for deploying bulk material from said FIBC onto said conveyor; and
wherein said enclosure is pivotablly mounted to a frame at a pivot point such that said enclosure can be pivoted to an angle suitable to deploy said bulk material from said flexible container into said spout and out onto said conveyor belt.

11. The system of claim 10, further comprising:
a lever arm affixed to said frame, said lever arm configured for pivoting said enclosure about said pivot point;
a hydraulic piston and cylinder affixed to said lever arm, said hydraulic piston and cylinder configured for rotating said lever arm about said pivot point; a gate valve with actuator located in the spout of enclosure, and
a hydraulic pump configured for delivering hydraulic power to said piston and cylinder.

12. A flexible intermediate bulk container (FIBC), further comprising:
the FIBC being comprised of a high strength, flexible fabric configured for storing bulk material;
said FIBC comprising a top opening configured for receiving and deploying said bulk material;
wherein said FIBC is collapsible to a transportable orientation upon being emptied of said bulk material;
a one or more sets of lifting straps wrapped about an exterior face of said FIBC, said first lifting strap comprising a first set of lifting loops; and
wherein each one of said set of lifting loops comprising a rigid material.

13. The system of claim 12, wherein said rigid material is comprised of spring-like material configured to hold said lifting loops away from said flexible container in an open configuration.

14. The system of claim 1, further comprising:
a loading system configured to be connected to a top side of said flexible container; and
wherein said flexible container is configured to be loaded and unloaded from said loading system.

15. The system of claim 1, further comprising at least one band of strengthening material attached horizontally around sides of the flexible container.

16. A flexible intermediate bulk container (FIBC), further comprising:
the FIBC being comprised of a high strength, flexible fabric configured for storing bulk material;
said FIBC comprising a top opening configured for receiving and deploying said bulk material;
wherein said FIBC is collapsible to a transportable orientation upon being emptied of said bulk material;
a first lifting strap wrapped about an exterior face of said FIBC, said first lifting strap comprising a first set of lifting loops; and
a second lifting strap wrapped about said exterior face of said FIBC, said second lifting strap comprising a second set of lifting loops;
at least two sets of lifting loops per two opposing sides of the FIBC, said at least two sets of lifting loops configured to allow said FIBC to be transferred from a first machine having two tines to a second machine having two tines.

17. A flexible intermediate bulk container (FIBC), further comprising:
the FIBC being comprised of a high strength, flexible fabric configured for storing bulk material;
said FIBC comprising a top opening configured for receiving and deploying said bulk material;
wherein said FIBC is collapsible to a transportable orientation upon being emptied of said bulk material;
a first lifting strap wrapped about an exterior face of said FIBC, said first lifting strap comprising a first set of lifting loops;
a second lifting strap wrapped about said exterior face of said FIBC, said second lifting strap comprising a second set of lifting loops;
said first set of lifting loops comprising a first horizontal row of lifting loops;
said second set of lifting loops comprising a second horizontal row of lifting loops; and
wherein said first and second horizontal rows of lifting loops are configured to allow rotation of said FIBC about a z-axis.

18. The system of claim 17, wherein said first set of lifting loops and said second set of lifting loops are separated by a distance greater than one-fifth of a height of said container.

19. The system of claim 1, further comprising a discharge spout affixed about a top face comprising said top opening of said flexible container.

20. The system of claim 1, further comprising:
a pallet comprising vertical structural members; and
said vertical structural members configured to support said flexible container during a filling process.

21. A method of loading, transporting, and deploying a granular material, the method comprising the steps:
providing a flexible container comprising a base, four walls, and a top having an opening, wherein said base, four walls, and top form and surround an internal space of said flexible container;
filling said flexible container with a dry bulk cargo material via said opening;
securing said flexible container and transporting said flexible container from a loading site to a deployment site;
transferring said flexible container about said deployment site by lifting said flexible container about an at least one set of lifting loops, where said at least one set of lifting loops are located against exterior faces of said four walls;
wherein each lifting loop of said at least one set of lifting loops comprising a rigid material;
rotating said flexible container such that said dry bulk cargo material is deployed at said deployment site from said flexible container; and
reusing said flexible container.

22. The method of claim 21, further comprising the steps:
inserting a first set of machine tines into said first set of lifting loops;

inserting a second set of machine tines into said second set of lifting loops; and transferring said flexible container using a fork truck comprising said first and second fork truck tines.

23. The method of claim 22, further comprising the steps:

rotating said flexible container about a Z-axis using said fork truck; and deploying said dry bulk cargo material via said opening upon rotating said flexible container up to 180 degrees.

24. The method of claim 23, further comprising the steps:

sealing said opening of said flexible container with a zipper;

sealing said opening of said flexible container with a closure mechanism;

wherein said first zipper is located inside of said second zipper;

opening said closure mechanism; and said dry bulk cargo material pressing against and automatically opening said zipper upon rotating said flexible container.

25. The method of claim 23, further comprising the steps:

providing a deployment spout and connecting said deployment spout about said opening; and said deployment spout comprising a gate valve for opening and closing said deployment spout.

26. A method of loading a flexible intermediary bulk container (FIBC), further comprising the steps:

providing the FIBC comprising a base, four walls, and a top having an opening, wherein said base, four walls, and top form and surround an internal space of said FIBC;

filling said FIBC with a dry bulk cargo material via said opening;

securing said FIBC and transporting said FIBC from a loading site to a deployment site;

transferring said FIBC about said deployment site by lifting said flexible container about an at least one set of lifting loops, where at least one set of lifting loops are located against exterior faces of said four walls;

loading said flexible container into a compartment, said compartment comprising a deployment spout and a gate valve for opening and closing said deployment spout;

said compartment being pivotally mounted to a frame adjacent to a conveyor assembly;

pivoting said compartment about said frame such that said deployment spout is positioned over said conveyor assembly;

opening said deployment spout with said gate valve;

rotating said FIBC such that said dry bulk cargo material is deployed at said deployment site from said FIBC;

deploying said dry bulk cargo material onto said conveyor assembly;

transferring said dry bulk cargo material about said deployment site using said conveyor assembly; and reusing said flexible container.

27. The method of claim 26, further comprising:

activating a hydraulic piston and cylinder;

pushing a lever arm affixed to said compartment, thereby pivoting said compartment; and wherein a hydraulic pump powers said hydraulic piston and cylinder.

28. The method of claim 21, further comprising the steps:

wherein said rigid material is comprised of spring-like material; and holding each one lifting loop in an open configuration with said rigid material, thereby holding said lifting loop away from said flexible container.

29. A method implementing the system of claim 18, further comprising the steps:

positioning horizontal support members through a respective one of said lifting loops on opposing sides of said flexible container prior to filling said flexible container;

supporting said flexible container with said horizontal support members while filling said flexible container; and removing said horizontal support members upon filling said flexible container.

* * * * *